United States Patent
Mihara et al.

(10) Patent No.: US 6,891,738 B2
(45) Date of Patent: May 10, 2005

(54) POWER-SUPPLY UNIT FOR ELECTRONIC OVEN

(75) Inventors: Makoto Mihara, Nara (JP); Kenji Yasui, Yamatokoriyama (JP); Takeshi Kitaizumi, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 51 days.

(21) Appl. No.: 10/432,705

(22) PCT Filed: Dec. 26, 2002

(86) PCT No.: PCT/JP02/13685

§ 371 (c)(1),
(2), (4) Date: May 27, 2003

(87) PCT Pub. No.: WO03/077406

PCT Pub. Date: Sep. 18, 2003

(65) Prior Publication Data

US 2004/0145929 A1 Jul. 29, 2004

(30) Foreign Application Priority Data

Mar. 12, 2002 (JP) ........................................ 2002-067105

(51) Int. Cl.[7] ............................. H02M 3/24; H05B 6/68
(52) U.S. Cl. ........................... 363/97; 363/131; 219/716
(58) Field of Search ............................. 363/34, 37, 55, 363/56.1, 95, 97, 131, 132; 219/660, 661, 670, 672, 676, 677, 715, 716, 721

(56) References Cited

U.S. PATENT DOCUMENTS

| | | | | | |
|---|---|---|---|---|---|
| 5,208,432 | A | * | 5/1993 | Han | 219/716 |
| 5,451,750 | A | * | 9/1995 | An | 219/716 |
| 6,040,688 | A | | 3/2000 | Strübin | |
| 6,388,899 | B1 | * | 5/2002 | Suenaga et al. | 363/20 |
| 6,449,178 | B1 | * | 9/2002 | Sakai et al. | 363/131 |
| 6,617,685 | B1 | * | 9/2003 | Bollesen | 257/719 |

* cited by examiner

*Primary Examiner*—Matthew V. Nguyen
(74) *Attorney, Agent, or Firm*—Pearne & Gordon LLP

(57) ABSTRACT

A Hall element (H) is arranged at an air gap of a choke coil (30). Power semiconductor elements (P1) and (P2) are attached to a heat radiation fin (61) directly by soldering. A rectangular-hollow-shaped metal core (27) is formed by winding a long metal thin plate multiple turns into a rectangular-hollow-shape and is fitted to a bar shaped ferrite core (26) from outside of the primary winding (21) and the secondary winding (22). The inner diameter of one side of the rectangular-hollow-shape core is larger than both outer diameters of the primary winding (21) and the secondary winding (22) and the inner diameter of the other side of the rectangular-hollow-shape core is larger than the height of the primary winding (21) and the secondary winding (22). The rectangular-hollow-shape (27) core is arranged such that an air gap (G) exists between the rectangular-hollow-shape core (27) and the bar shaped ferrite core (26).

5 Claims, 9 Drawing Sheets

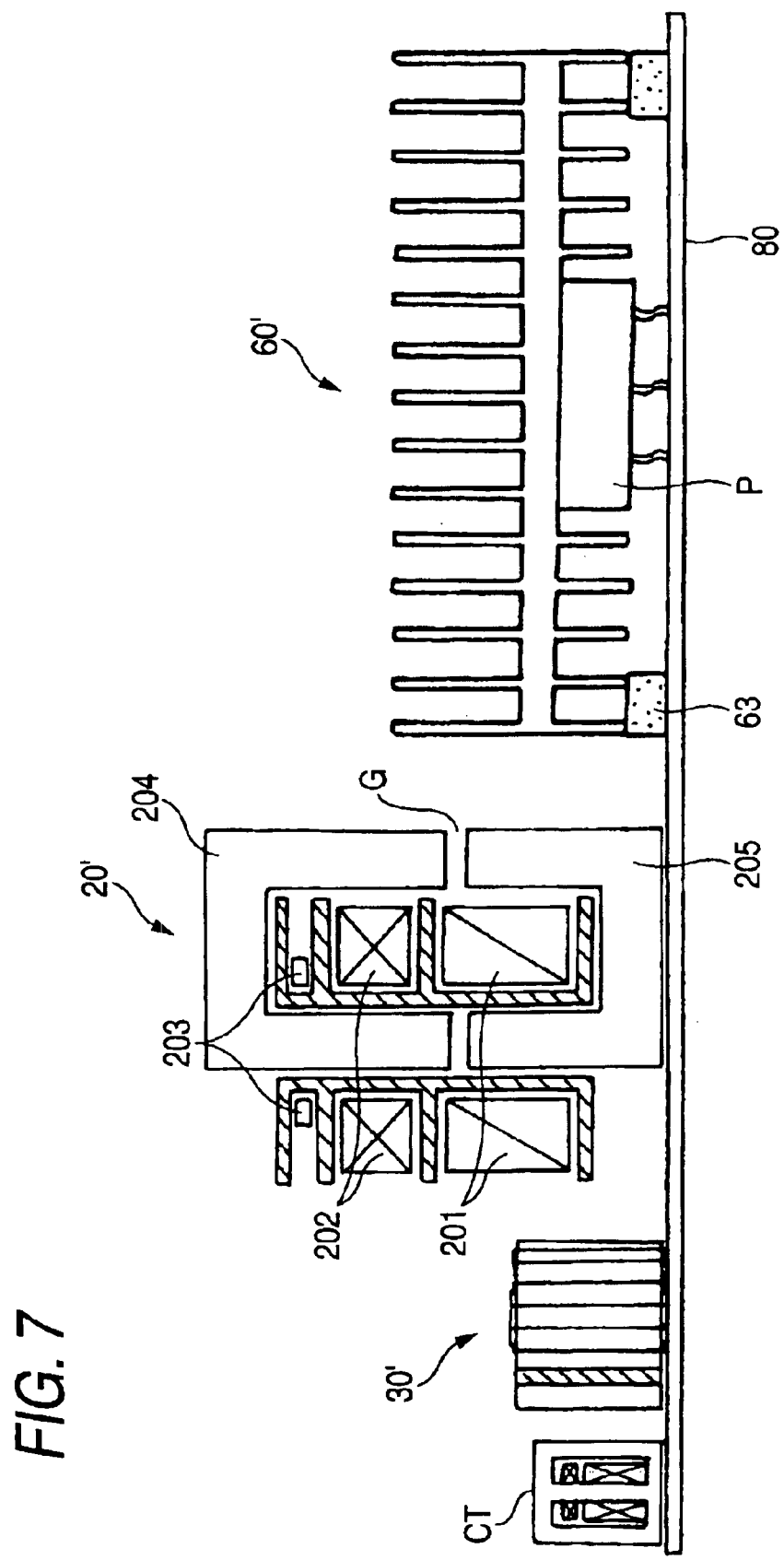

POWER-SUPPLY UNIT FOR ELECTRONIC OVEN

TECHNICAL FIELD

The invention relates to a power-supply unit for an electronic oven, more particularly to a power-supply unit having a choke coil, a power element, a booster transformer and the like thus miniaturization, lightweight, low cost and high reliability can be realized.

BACKGROUND ART

FIG. 9 is a constructing view of a general magnetron drive power-supply unit having a choke coil, a power element, a booster transformer, and the like. In the figure, alternating current from a commercial power-supply 11 is rectified to direct current by a rectifying circuit 13, the rectified current is smoothed by a choke coil 14 and a filter capacitor 15 which is provided at the output side of the rectifying circuit 13, and the smoothed current is applied to input side of an inverter 16. Direct current is converted to the desired high frequency (20 to 40 kHz) by on/off of a semiconductor-switching element in the inverter 16. The inverter 16 includes two groups of switching element groups for switching direct current with high speed where plural power MOSFET are connected in parallel for example, and a drive circuit driving these switching element groups. The drains of the power MOSFET constituting the switching element groups are connected to one end and the other end of a primary winding 181 of a booster transformer 18 respectively, both sources of the power MOSFETs constituting these two switching groups are connected, and further gates of the power MOSFETs constituting the switching groups are connected to the switching element drive circuit respectively. The switching element groups constituted by the power MOSFETs are driven by an inverter control circuit 161, and current flowing through primary side of the booster transformer 18 is switched on/off with high speed.

The primary side current of the rectifying circuit 13 is detected by a CT 17 as an input signal of the control circuit 161, the detected current is inputted to the control circuit 161 so as to use for control of the inverter 16.

The choke coil 14 and the filter capacitor 15 perform a function that a high frequency noise does not transmit to the commercial power-supply 11 while converting to high frequency from direct current, therefore, the choke coil 14 and the filter capacitor 15 have inductance and capacitance of a degree to remove the high frequency noise.

In the case that the core of the choke coil 14 is small, large inrush current flows causing the coil to saturate thus the choke cannot perform its function. In contrast, in the case that a large core is used, the coil does not saturate, however a disadvantage is that the choke coil itself becomes large in size and weight and therefore becomes heavy. Then, the problem of saturation is solved by using a choke coil winding a matter having a slit to longitudinal direction of a tube-shaped core as shown in FIG. 8 with electric wire.

In the booster transformer 18, a high frequency voltage being output of the inverter 16 is applied to the primary winding 181, and high voltage corresponding to turn ratio is obtained at a secondary winding 182. A winding 183 little in number of turns is provided at the secondary side of the booster transformer 18, and is used for heating a filament 121 of the magnetron 12. At the side of the secondary winding 182 of the booster transformer 18, a voltage doubler half-wave rectifying circuit 19 is provided to rectify the output of the booster transformer 18. The voltage doubler half-wave rectifying circuit 19 includes a high voltage capacitor 191 and two high voltage diodes 192 and 193, the high voltage capacitor 191 and the high voltage diode 192 are conductive at positive cycles (an upper end of the secondary winding 182 is positive for example in the figure), and electric charge is charged positive to the left side of the electrode plate of the high voltage capacitor 191 in the figure, negative to the right side of the electrode plate. Next, at negative cycles (a lower end of the secondary winding 182 is positive), the high voltage diode 193 is conductive, and doubler voltage plus voltage of the high voltage capacitor 191 previously charged and the secondary winding 182 is applied between an anode 122 and a cathode 121 of the magnetron 12.

FIG. 7 shows an example of mounting the conventional power-supply unit for electronic oven on a printing board. The mounting example shows that the booster transformer 20' supplying power to a magnetron (not shown), the CT, the choke coil 30', and a heat radiation fin 60' are provided on the printing board 80.

Thus, in the conventional unit, a current transformer CT (17 in FIG. 9) detecting the primary side current of the rectifying circuit 13 (FIG. 9) is provided on the board. The turn ratio of the CT is about 1:2000, current flowing through one wind can be detected with minute current of 1/2000, and the CT transmits to the inverter control circuit with low loss.

The choke coil 30' is provided on the board.

FIGS. 8A to 8C are views explaining the choke coil 30', FIG. 8A is a plane view, FIG. 8B is a front view, and FIG. 8C is a perspective view. In the figures, symbol 31 is a cylindrical core constructed by high permeability material (ferrite material for example). Symbol 32 is a winding wound a large numbers of windings over the inside and outside of the cylindrical core 31, symbol 33 is a resin covering the whole cylindrical core 31, and the cylindrical core 31 and the winding 32 are insulated by the resin. Symbol 34 is an air gap for depressing saturation because the high permeability material such as ferrite and the like saturates rapidly at large current.

Returning to FIG. 7, the booster transformer 20' provided on the board shows an example of a conventional booster transformer using a ferrite core. In FIG. 7, a primary winding 201, a secondary winding 202, and a heater winding 203 are arranged in parallel on the same axis of two facing horseshoe-shaped ferrite cores 204 and 205. In the case of power-supply for magnetron drive dealing frequently large power, zero volt switching system (ZVS system hereafter) by voltage resonance prevails. In the ZVS system, it is necessary to set the coupling coefficient of the booster transformer at about 0.6 to 0.85 to obtain resonance voltage, therefore, an air gap G is provided. Thus, the booster transformer 20' converts low voltage applied to the primary winding 201 to high voltage corresponding to the turn ratio to generate at the secondary winding 202 without saturation even at large current.

The heat radiation fin 60' is provided with a power semiconductor element at the state of a package P in which the power semiconductor element is covered with a molding resin. By providing the heat radiation fin 60', heat generated at the power semiconductor element is transmitted to the heat radiation fin 60' through the package P, the power semiconductor element is not heated because the heat is diffused efficiently from here, therefore heat failure of the power semiconductor element does not generate.

Since the CT is large, that is the turn ratio thereof is 1:2000 as mentioned above, the amount of space the CT occupies on the board cannot be neglected.

In the case of the prior booster transformer using two facing horseshoe-shaped ferrite cores 204 and 205, it is necessary to increase peak current flowing through the primary side of the booster transformer in order to make the output of the magnetron higher in the booster transformer 20'. By that, the ferrite core becomes easy to saturate because saturation magnetic flux density characteristic is bad, and a large ferrite core is necessary for no or little saturation. This is an obstruction of the miniaturization of the power-supply.

Since the heat radiation fin 60' is in the state of the package P in which the power semiconductor element is covered with mold resin, heat generated at the power semiconductor element is transmitted to the heat radiation fin 60' through the package P so that heat radiation performance is not entirely good.

To solve the problem, the invention provides a power-supply unit for an electronic oven enabling to detect current without using the CT and realizing miniaturization, lightweight, and low cost by miniaturizing of the booster transformer and by the small size of the heat radiation fin in which cooling efficiency of the power semiconductor element high.

DISCLOSURE OF THE INVENTION

To solve the above problems, according to the power-supply unit for an electronic oven, the unit provides a rectifying circuit, a choke coil provided at the output side of the rectifying circuit, an inverter converting direct current to high frequency electric power by switching a power semiconductor element, an inverter control circuit controlling the inverter, and a booster transformer boosting the output voltage of the inverter on a board, wherein the choke coil has an air gap at the core portion, and a Hall element is arranged at the air gap.

Preferably, an output signal of the Hall element is transmitted to the inverter control circuit in the power-supply unit for the electronic oven.

According to the above invention, since a large CT due to the turn ratio of 1:2000 as described above is not necessary to use, the power-supply unit of miniaturization, lightweight, and low cost is obtained.

Further, the power semiconductor element is attached at the heat radiation fin directly by soldering in the power-supply unit for an electronic oven.

According to the above invention, since the power semiconductor element is attached at the heat radiation fin directly, heat radiation efficiency improves, further the power-supply unit of miniaturization, lightweight, and low cost is obtained.

Moreover, the power semiconductor element is attached at the heat radiation fin directly through a punching copper plate by soldering in the power-supply unit for an electronic oven.

According to the above invention, since the power semiconductor element is attached at the heat radiation fin directly through a punching copper plate, the power-supply unit of further miniaturization, lightweight, and low cost is obtained because heat radiation efficiency improves and high density mounting is possible.

Further, the booster transformer is a magnetron drive booster transformer in which a primary winding and a secondary winding surround a bar shaped ferrite core, a rectangular-hollow-shaped core is fitted facing the bar shaped ferrite core from outside of the primary winding and the secondary winding, and is arranged providing an air gap between the axis direction end portion of the bar shaped ferrite core and surrounding edge of the rectangular-hollow-shaped core in the power-supply unit for an electronic oven.

According to the above invention, since a ferrite core low in high frequency loss is provided as a main core and a rectangular-hollow-shaped core is provided having an air gap facing to the core, the invention contributes to the power-supply unit of further miniaturization, lightweight, and low cost because the construction is small size, strong, and further mechanically protects the outside of each winding.

Still further, the booster transformer is a magnetron drive booster transformer in which a primary winding and a secondary winding surround a bar shaped ferrite core, a rectangular-hollow-shaped core is fitted facing said bar shaped ferrite core from outside of the primary winding and the secondary winding, and is arranged providing an air gap between the axis direction end portion of the bar shaped ferrite core and inside of the rectangular-hollow-shaped core in the power-supply unit for an electronic oven.

According to the above invention, since a ferrite core low in high frequency loss is provided as a main core and a rectangular-hollow-shaped core is provided having an air gap facing the core, the invention contributes to the power-supply unit of further miniaturization, lightweight, and low cost because the construction is small size, strong, and further mechanically protects the outside of each winding including the ferrite core.

BRIEF DESCRIPTION OF THE DRAWINGS

FIG. 3A is a plane view, FIG. 3B is a front view, and FIG. 3C is a perspective view;

FIG. 4A is a front view, FIG. 4B is a plane view, FIG. 4C is a side view, and FIG. 4D is a perspective view;

FIG. 5A is a front view, FIG. 5B is a plane view, FIG. 5C is a side view, and FIG. 5D is a perspective view;

FIG. 7 is a view showing an example attaching the conventional power-supply unit for electronic oven on a printing board;

FIG. 8A is a plane view, FIG. 8B is a front view, and FIG. 8C is a perspective view; and FIG. 9 is a conventional construction of a magnetron driving power-supply using a choke coil, a power element, a booster transformer, and the like.

BEST MODE FOR CARRYING OUT THE INVENTION

Figure 2:
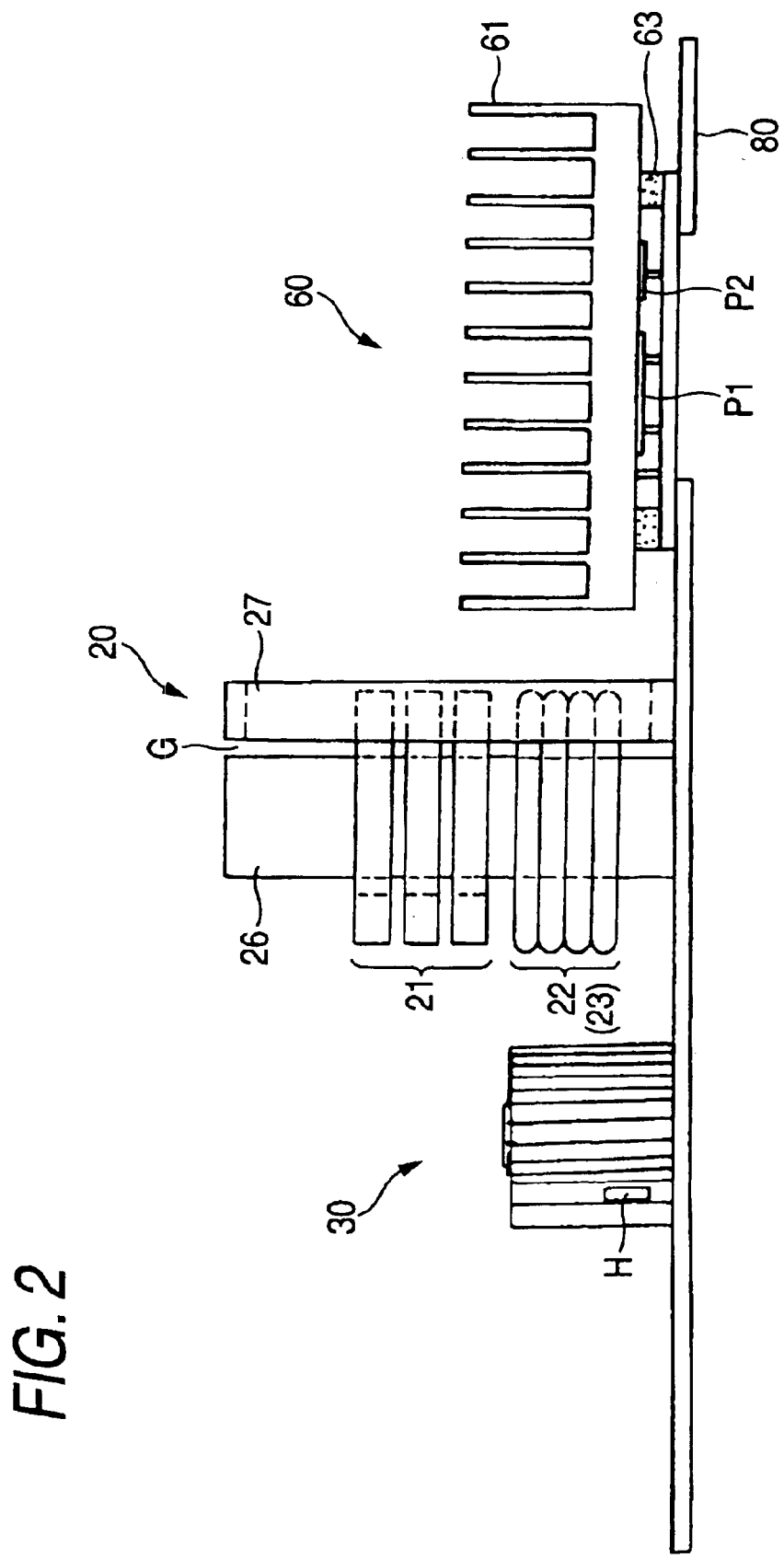
FIG. 2 is a view showing an example of mounting attaching a power-supply unit for electronic oven according to the invention on a printing board.

FIG. 2 shows an example of mounting a power-supply unit for an electronic oven on a printing board. On a printing board 80, a booster transformer 20, a choke coil 30, and a heat radiation fin 60 for radiating heat loss of a package including a power semiconductor element according to the invention respectively are provided.

First, the choke coil 30 according to the invention will be described. In the invention, a Hall element, not a CT, is used for detecting current. The Hall element generates voltage in proportion to magnetic field applied, i.e., Hall voltage, therefore, the magnetic field generating in proportion to current flowing through the current passage acts to the Hall element so as to obtain voltage in proportion to the current from the Hall element by arranging the Hall element along a current passage. As an example of concrete circuit construction, Japanese Unexamined Utility Model Publication No. S61-52272 is disclosed for example. In the publication, magnetic flux generating in a magnetic core by current flowing through a winding is converted to voltage by a Hall element so as to obtain current value detected from the voltage by winding the magnetic core with wire where current to be detected flows, by providing an air gap at the magnetic, and by arranging the Hall element at the air gap.

Figure 9:
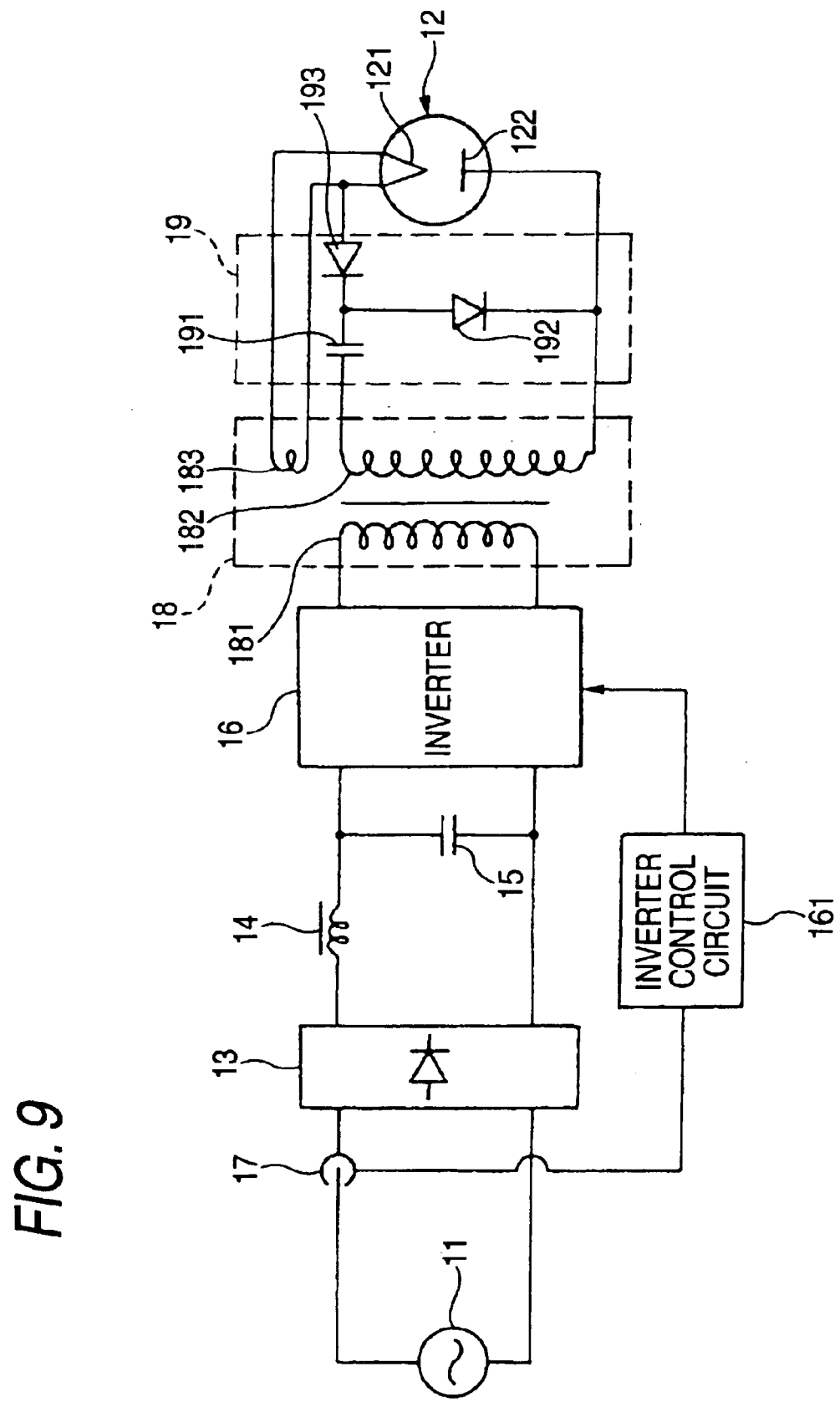

The invention applies this principle and uses the magnet core type Hall element with air gap instead of the CT 17 of FIG. 9. As a result, good current detection is obtained similarly as in the case of using the CT 17.

However, because using only the Hall element instead of the CT 17 does not contribute to miniaturization, lightweight, and low cost of the power-supply unit, the applicant tried further experiment and improvement. As a result, the applicant noticed that the input current value and the output current value of the rectifying circuit 13 in FIG. 9 are in proportional relation as a numerical value though directions of positive and negative are different, and tried to provide a magnetic core type Hall element with an air gap at output side of the rectifying circuit 13. However, using only the Hall element at the output side of the rectifying circuit 13 does not contribute to miniaturization, lightweight, and low cost of the power-supply unit.

Then, the applicant tried to arrange the Hall element in the air gap of the choke coil 14 of FIG. 9.

Figure 3C:
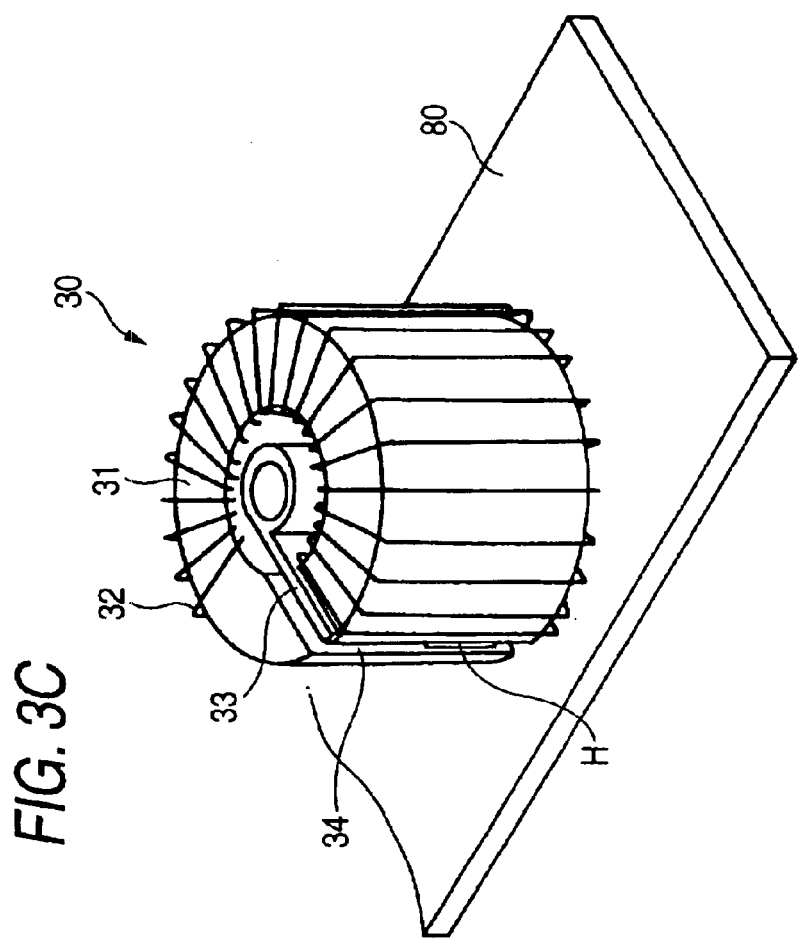
FIGS. 3A to 3C are views showing explaining a choke coil according to the invention.
Figure 3A:
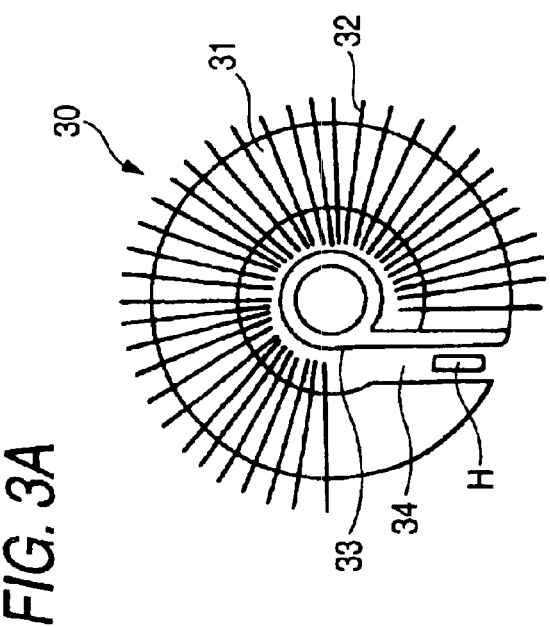
Figure 3B:
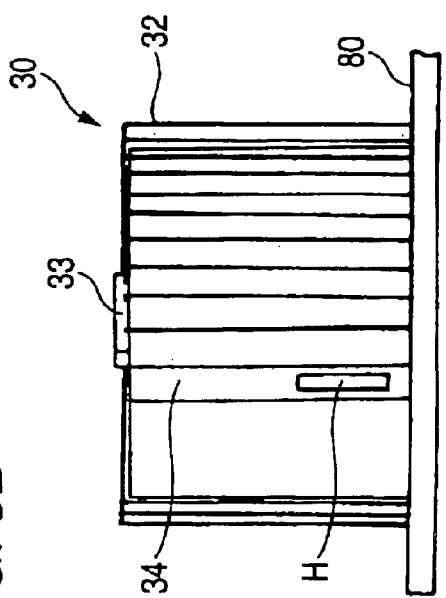

FIGS. 3A to 3C are views explaining a choke coil according to the invention, FIG. 3A is a plane view, FIG. 3B is a front view, and FIG. 3C is a perspective view. In the figures, symbol 30 is a choke coil according to the invention, and symbol 31 is a cylindrical core constructed by high permeability material (ferrite material for example). Symbol 32 is a winding wound a large number of windings over the inside and outside of the cylindrical core 31, symbol 33 is a supporting body for supporting the cylindrical core 31 and the winding, and symbol 34 is an air gap provided so that high permeability material such as ferrite and the like does not saturate. Further, in the present invention, a Hall element H is arranged at the air gap 34.

As a magnet sensing film of the Hall element H, for example, InSb having high mobility and good sensibility, or GaAs having a large energy band gap width and good temperature characteristics, is used. In the construction thereof, after forming the magnet sensing film such as InSb, InAs, GaAs, and the like on a surface of a semi-insulating GaAs substrate by implanting Si and so on, patterning to the desired pattern is performed, an inner electrode is formed at the magnet sensing film to allow the current to flow to an inorganic protecting film such as $SiO_2$, SiN and the like, and then, dicing, die bonding and wire bonding are performed, and the Hall element is molded with resin connecting the wire to the electrode.

Figure 1:
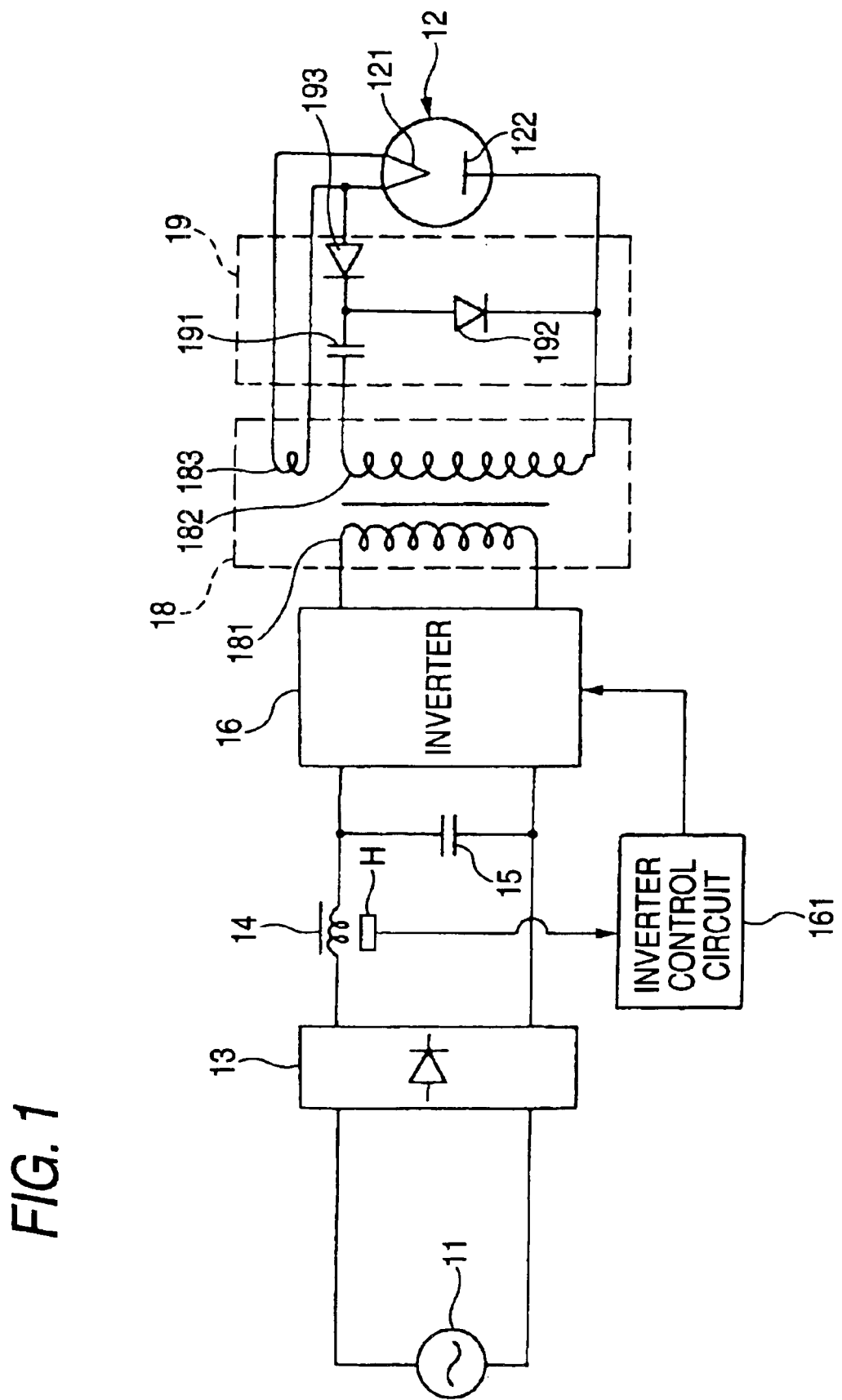
FIG. 1 is view of construction of a magnetron driving power-supply using a choke coil, a power element, a booster transformer, and the like according to the invention.

FIG. 1 is a constructing view of a magnetron drive power-supply unit according to the present invention.

The output signal of the Hall element H is transmitted to an inverter circuit 161. In this case, since it is not necessary to provide the CT 17 for detecting input current of the rectifying circuit 13 as the conventional power-supply unit, the CT 17 is detached.

By the description above, using the choke coil 14 obtains the same current detecting effect with the same shape and does not use the CT 17 so that the power-supply unit is miniaturized, becomes lightweight, and becomes low cost.

Returning to FIG. 2, the booster transformer 20 provided on the board 80 is conducive to miniaturization of the unit, a ferrite core a low in high frequency loss is provided for a main core 26, the air gap G is provided so as not to saturate, and a small sized metal core 27 hard to saturate is arranged at outside of a primary winding 21, a secondary winding 22, and a heater winding 23 facing the gap.

Figure 4A:
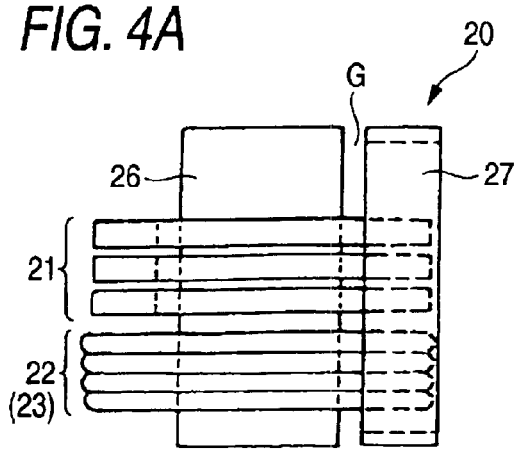
FIGS. 4A to 4D are views showing a first example of a booster transformer according to the invention.
Figure 4B:
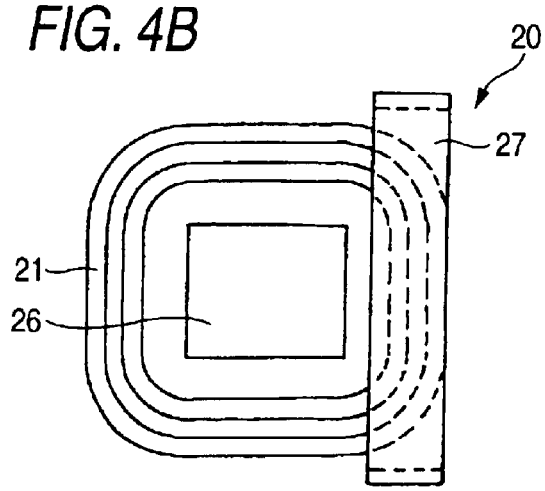
Figure 4C:
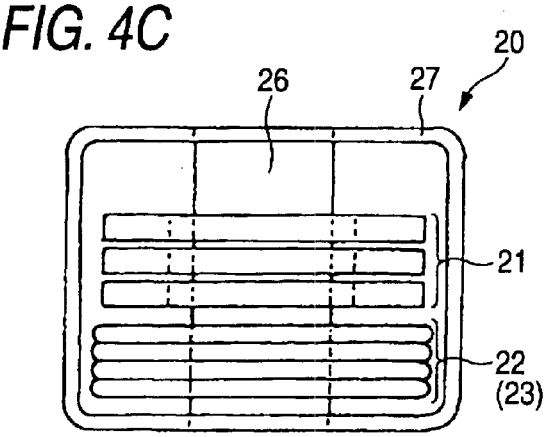
Figure 4D:
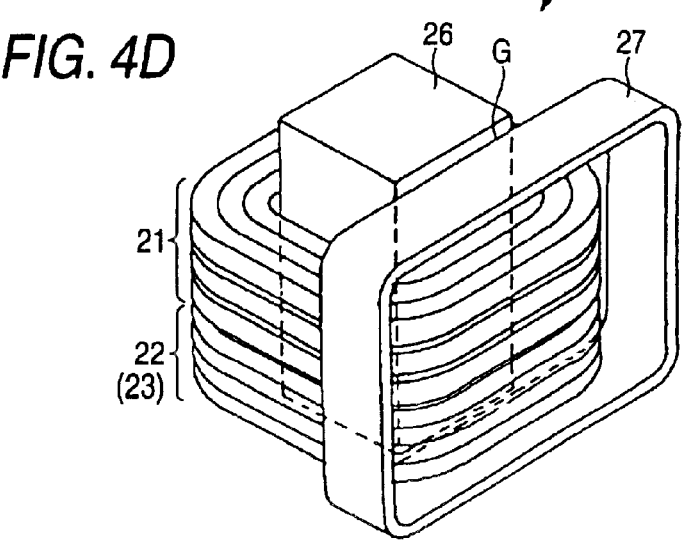

FIGS. 4A to 4D are views showing the booster transformer 20 in detail, FIG. 4A is a front view, FIG. 4B is a plane view, FIG. 4C is a side view, and FIG. 4D is a perspective view. In the figure, symbol 20 is a booster transformer according to a first example of the invention, symbol 21 is a primary winding, symbol 22 is a secondary winding, and symbol 23 is a heater winding. The primary winding 21 is large in space of windings and small in number of turns compared with the secondary winding 22. The heater winding 23 has an extremely small number of turns compared with the secondary winding 22, and therefore is not drawn in the figure. Since the heater winding 23 may be constructed by other parts, it is not an essential part here. Symbol 26 is a bar-shaped ferrite core, and a rectangular parallelepiped shape is adopted here. The primary winding 21, the secondary winding 22, and the heater winding 23 surround the periphery of the rectangular parallelepiped shaped ferrite core 26 respectively, and are stacked substantially parallel to the axis direction of the core.

Symbol 27 is a metal core adopted by the invention, and is produced by winding a long metal thin plate including amorphous, silicon steel plate, and the like, in a rectangular hollow shape multiple times (about 10 to 40 turns), and insulating between each layers. Among the inner diameter of the rectangular-hollow-shaped metal core, one inner diameter (inner diameter of right and left direction of the metal core 27 in FIG. 4C) is larger than any of the outer diameters of the primary winding 21, the secondary winding 22, and the heater winding 23, and the other inner diameter (inner diameter of up and down direction of the metal core 27 in FIG. 4C) is larger than the height of the three windings of the primary winding 21, the secondary winding 22, and the heater winding 23.

Therefore, the metal core 27 in the figures is fitted to the primary winding 21, the secondary winding 22, and the heater winding 23 from outside thereof facing the ferrite core 26, and is arranged facing the ferrite core keeping the air gap G to the bar shaped ferrite core 26 as shown in FIG. 4D. The gap between the ferrite core 26 and the metal core 27 is about 0.3 to 0.8 mm.

By the above construction, a ferrite core low in high frequency loss is provided for a main core, the air gap is provided so as not to saturate, and a small sized metal core hard to saturate is arranged outside of the primary winding 21, the secondary winding 22, and the heater winding 23 facing the gap, so the construction makes a substantial contribution for miniaturization compared with the conventional booster transformer 20' (FIG. 7) consisting of only the ferrite core. That is, in the conventional booster transformer 20', a part of the ferrite core arranged at the outside of the primary winding 21, the secondary winding 22, and the heater winding 23 is constructed by the almost the same cross-sectional area as a part of the main ferrite core, so projects on a large scale to outside of the primary winding 21, the secondary winding 22, and the heater winding 23. On the other hand, in the booster transformer 20 according to the invention, cross-sectional area of the core is made extremely small compared with the part of the ferrite core because of the metal core, therefore the core does not project to outside of the primary winding 21, the secondary winding 22, and the heater winding 23 (see FIG. 2).

Further, a long metal thin plate turned 10 to 40 turns is used, and the direction that the eddy current flows to is in the direction crossing the metal thin plate layer turned many turns. Therefore, the eddy current can hardly flow because eddy current does not flow in a cross-sectional area of one metal thin plate because the resistance value of a cross-sectional area of one metal thin plate is large. Therefore, high-frequency loss, a fault of the metal core at high frequency, becomes small by arranging the metal core of such the construction like above even at high frequency so as to obtain a booster transformer having both good points of the ferrite core and the metal core.

Figure 5A:
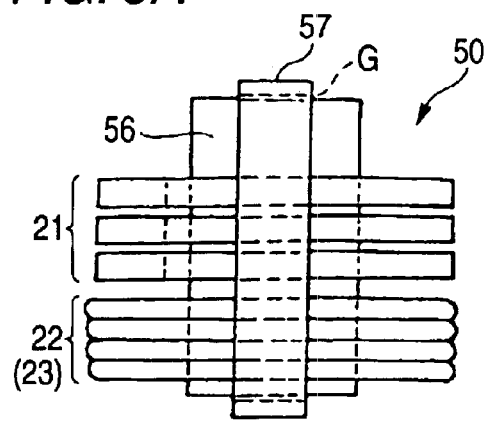
FIGS. 5A to 5D are views showing a second example of a booster transformer according to the invention.
Figure 5B:
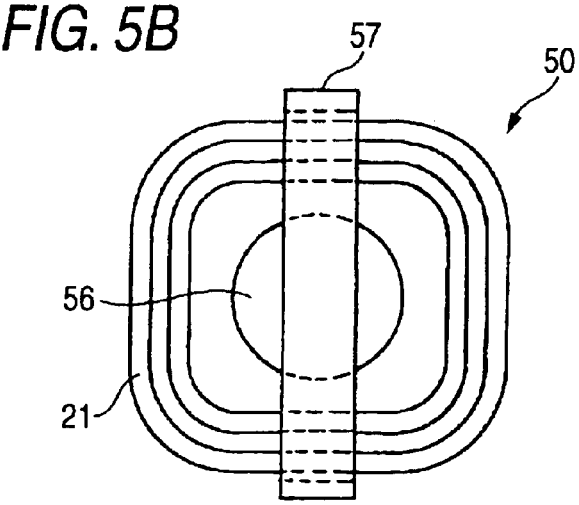
Figure 5C:
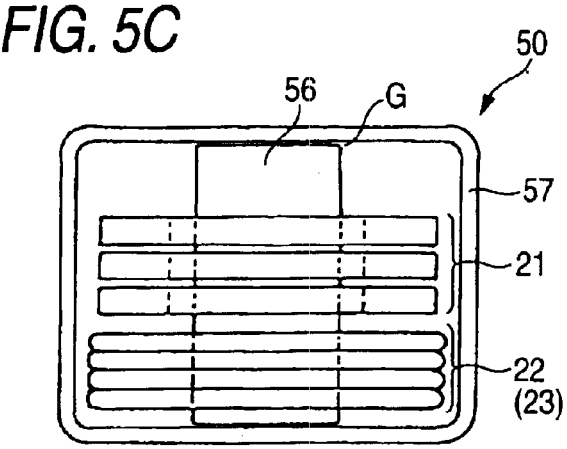
Figure 5D:
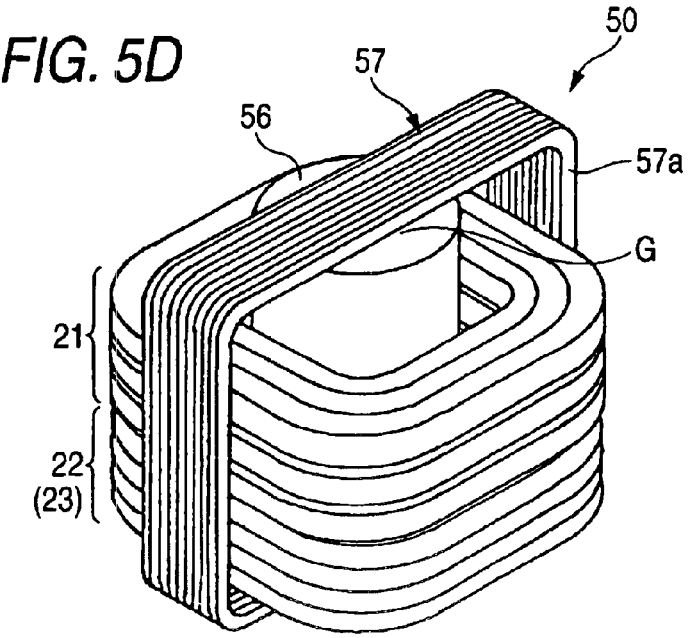

FIGS. 5A to 5D are views showing a second example of a booster transformer according to the invention, FIG. 5A is a front view, FIG. 5B is a plane view, FIG. 5C is a side view, and FIG. 5D is a perspective view. In the figure, symbol 50 is the second example of the booster transformer according to the invention. Symbol 21 is a primary winding, symbol 22 is a secondary winding, and symbol 23 is a heater winding, they are the same as that of FIG. 2. That is, the primary winding 21 is large in section of winding and small in number of turns compared with the secondary winding 22. The heater winding 23 is extremely small in number of turns compared with the secondary winding 22, therefore it is not drawn in the figure.

Then, in the second example of the booster transformer according to the invention, a columnar ferrite core 56 is used, and the primary winding 21, the secondary winding 22, and the heater winding 23 surround the periphery of the core so as to stack the windings substantially parallel to the axis direction of the core respectively.

A metal core of the booster transformer is produced by laminating multiple pieces (10 to 40 Pieces) of rectangular-hollow-shaped metal thin plates to add thickness using insulating adhesive. Among the inner diameter of the rectangular-hollow-shaped metal core, one inner diameter (inner diameter of right and left direction of the metal core 57 in FIG. 5C) is larger than any of the outer diameters of the primary winding 21, the secondary winding 22, and the heater winding 23, and the other inner diameter (inner diameter of up and down direction of the metal core 57 in FIG. 5C) is larger than the length of the column shaped ferrite core 56. The metal core 57 is fitted to the column shaped ferrite core 56 facing the ferrite core 56, and is arranged facing the end portion of axis direction of the ferrite core 56 keeping the air gap G as shown in FIG. 5D.

By the above construction, since the ferrite core low in high-frequency loss is used as a main core, the air gap is provided so as not to saturate, further the small size metal hard to saturate is arranged at outside of the primary winding 21, the secondary winding 22, the heater winding 23, and the ferrite core 56, the ferrite core contributes greatly to miniaturization compared with the conventional booster transformer 20' (FIG. 7) consisting of only a ferrite core.

Further, 10 to 40 pieces of the metal thin plate 27a are laminated, and the direction that the eddy current flows to is in the direction crossing the metal thin plate layer laminating the many pieces. Therefore, the eddy current can hardly flow because eddy current does not flow in a cross-sectional area of one metal thin plate because the resistance value of a cross-sectional area of one metal thin plate is large.

Therefore, high frequency loss, a fault of the metal core 57 at high frequency becomes small by arranging the metal core 57 as described above even at high frequency so as to obtain a booster transformer having both good points of the ferrite core and the metal core.

Further, since the ferrite core of the booster transformer is columnar shape, it is easier than the rectangular parallelepiped to produce. Since mutual facing parts of the ferrite core 56 and the metal core 57 are parallel at the air gap G where magnetic flux passes, the gaps G formed between them are the same width so as to become easy to design coupling coefficient and the like.

Still further, since the rectangular-hollow-shaped metal core 57 covers a part of the ferrite core 56 and each of the windings 21, 22, and 23 from the outside, the construction functions as mechanical protection.

Figure 6A:
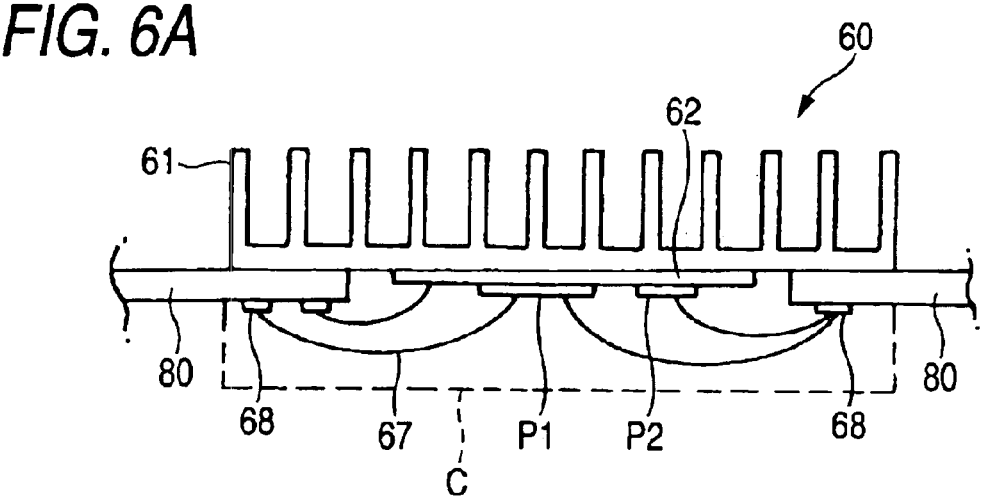
FIGS. 6A to 6C are views showing concrete three examples attaching a power semiconductor element directly at a heat radiation fin.
Figure 6B:
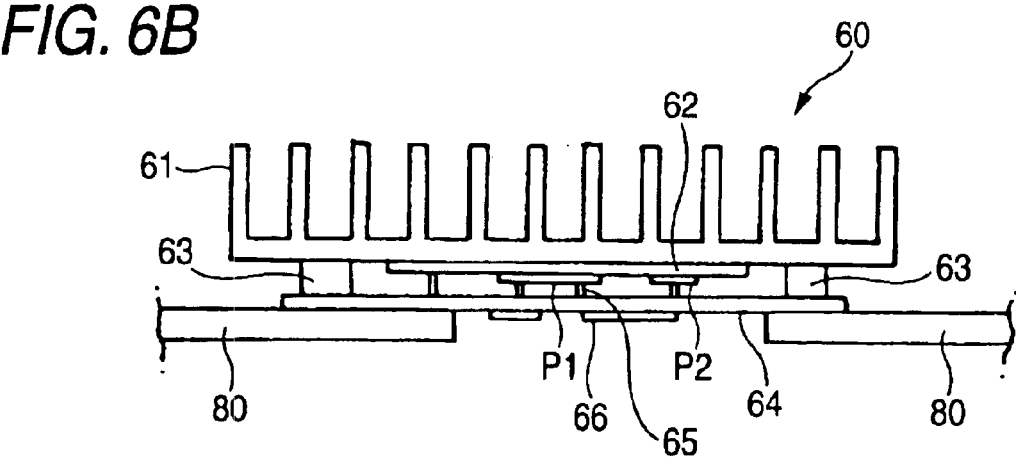
Figure 6C:
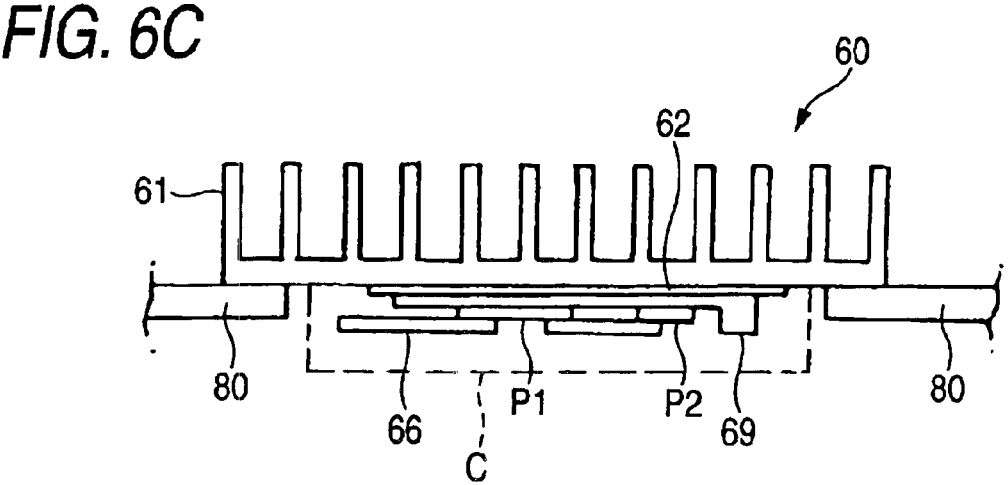
Figure 8C:
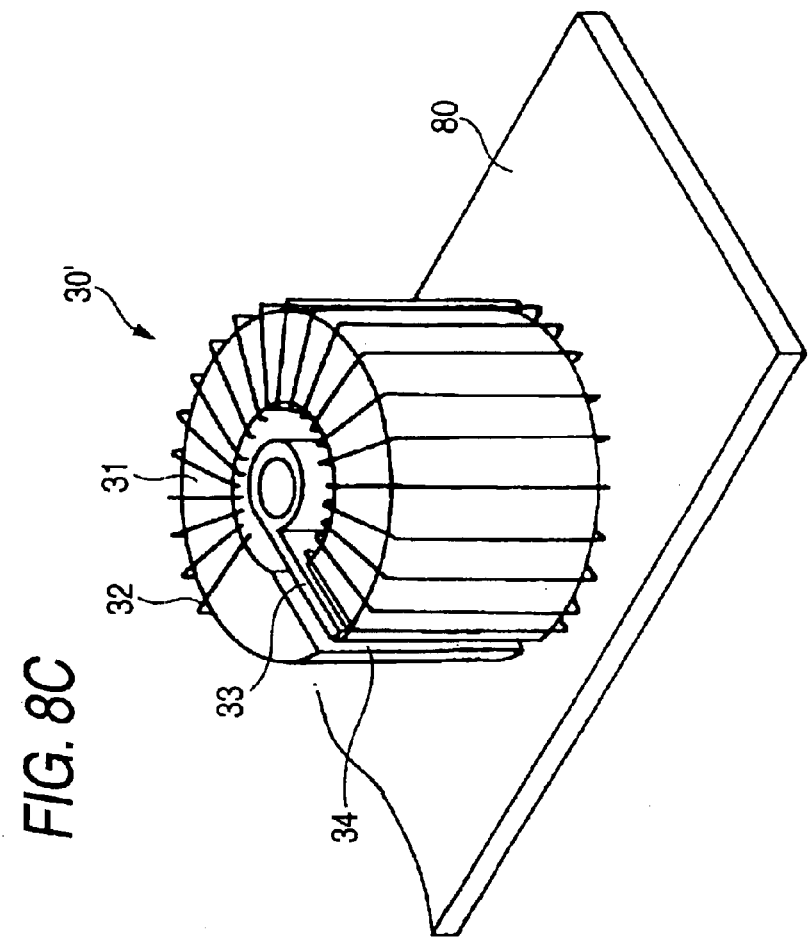
FIGS. 8A to 8C are views explaining the conventional choke coil.
Figure 8A:
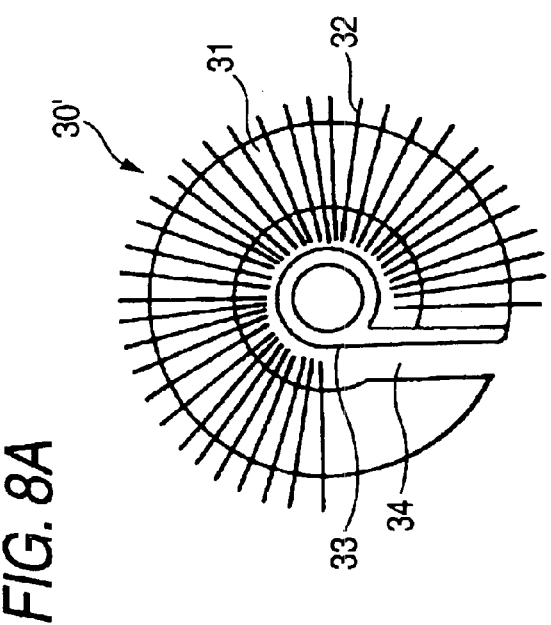
Figure 8B:
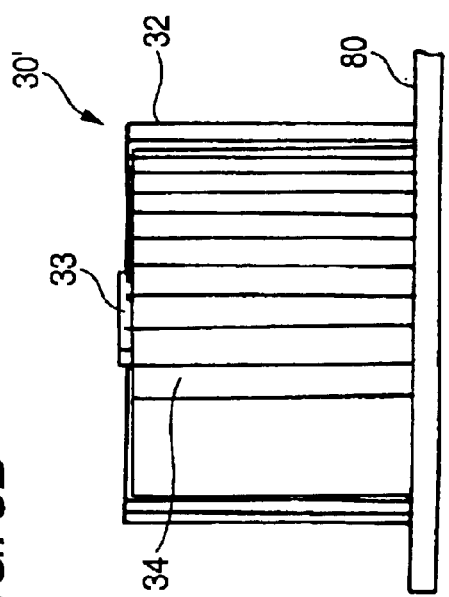

The heat radiation fin 60 of FIG. 2 according to the invention directly provided at the heat radiation fin without using a package for heat radiation of the power semiconductor element. FIGS. 6A to 6C show three concrete mounting examples of attaching the power semiconductor element directly at the heat radiation fin 60, FIG. 6A shows an example by wire bonding method, FIG. 6B shows an example by die bonding method, and FIG. 6C shows an example by punching copper plate method.

Referring to the wire bonding method in FIG. 6A, symbols P1 and P2 are heating semiconductor elements, for example, the former is the power semiconductor element, the latter is the semiconductor diode used in the inverter 16 (FIG. 1), both of them are elements that must be protected from overheating because they generate heat themselves. These power semiconductor elements P1 and P2, and the like are attached at the heat radiation fin 61 by soldering 62 directly according to the invention. Symbol 68 is a terminal provided at a printing board 80, symbol 67 are wires connecting the power semiconductor element P1, the semiconductor diode P2, and the terminal 68, and a compound portion C shown with a dotted line; the power semiconductor element P1, the semiconductor diode P2, the soldering part 62, the terminal 68, and wires 67, are molded with resin.

By the mounting method, since the power semiconductor element P1 and the semiconductor diode P2 are attached at the heat radiation fin 61 by soldering 62 directly, heat is not radiated through the thermal conductivity resin as with the conventional heat radiation fin. Therefore, heat conduction becomes good, and reduction of the size of the heat radiation fin 61 is realized.

Since the heat radiation fin 3 close to the power-supply circuit by making the heat radiation fin 61 small, drawing of wire becomes short and generation of noise is depressed and cooling efficiency greatly improve. Further, since the power semiconductor element P1 and the semiconductor diode P2 are connected to the terminal 68 of the board 80 by wire bonding 67, it is not necessary to use expensive mounting means such as a double-sided mounting board so that low cost mounting is possible.

Referring to the die bonding method in FIG. 6B, symbols P1 and P2 are heating semiconductor elements such as the power semiconductor element, and these power semiconductor elements P1 and P2, and the like are attached t the heat radiation fin 61 by soldering 62 directly according to the invention. Symbol 64 is a double-sided board having through-holes and symbol 65 is an insulator. For the printing board 80, low cost paper phenol is used. Symbol 65 is a solder bump provided at the electrode portions of the power semiconductor elements P1 and P2.

Since the power semiconductor element P1 and the semiconductor diode P2 are attached at the heat radiation fin 61 by soldering 62 directly by the mounting method, cooling efficiency improves sharply because the heat is not radiated through the thermal conductivity resin as the conventional heat radiation fin. Since the power semiconductor elements P1 and P2 are connected to the printing board 80 through the through-holes 64 and a terminal 66 on the opposite side from the bump 65 provided at the power semiconductor elements P1 and P2, the driving circuit of the power semiconductor element, can be positioned close to the board. Therefore, ideal driving is performed removing parasitic inductor and resistance components of the driving circuit so that switching loss and noise are depressed.

Further, work of drawing the wire 67 by the wire bonding method of FIG. 6A is omitted so that assembly becomes quick.

Referring to the punching copper plate method in FIG. 6C, symbols P1 and P2 are heating semiconductor elements such as the power semiconductor element, and these power semiconductor elements P1 and P2, and the like are attached partly at the heat radiation fin 61 by soldering 62 directly at the state arranged at a punching copper plate 69 according to the invention. Symbol 66 is a terminal connecting electrically to the printing board 80 using a punching copper plate similarly. By a compound portion C shown with a dotted line, the power semiconductor element P1, the semiconductor diode P2, the soldering part 62, the terminal 66, and the punching copper plate board 69 are molded with resin.

Since the power semiconductor element P1 and the semiconductor diode P2 are attached at the heat radiation fin 61 by soldering 62 directly through the punching copper plate board 69 by the mounting method, cooling efficiency improves sharply because the heat is not radiated through thermal conductivity resin is not laid as the conventional heat radiation fin. Since the punching copper plate board 69 itself has a role of a heat sink, radiation efficiency is good. Since the power semiconductor elements P1 and P2 are connected to the printing board 80 through the punching copper plate boards 69 and the terminal 66, work of drawing the wire 67 by the wire bonding method of FIG. 6A is omitted so that assembly becomes quick.

Further, since the double-sided board is not necessary, cost becomes low. Since there is degree of freedom to thickness of the conductor by using the punching copper plate, the whole circuit can be made small.

An example of a magnetron drive power-supply unit of the invention providing a choke coil, a power element, a booster transformer, and the like is shown above. However the driver power-supply is not limited to this, it may be any type converting DC-AC and boosting using a choke coil, a power element, a booster transformer, and the like.

The present invention has been explained in detail by referring to a specific embodiment. However, it would be apparent to one having ordinary skill in the art that the present invention can be variously changed or modified without departing from the spirit and scope of the invention.

The present application is based on Japanese Patent Application No. 2002-67105 filed on Mar. 12, 2002, and the content thereof is referred to and taken in here.

INDUSTRIAL APPLICABILITY

As described above, according to the invention, the power-supply unit for an electronic oven provides a rectifying circuit, a choke coil provided at an output side of the rectifying circuit, an inverter converting direct current to high frequency electric power by switching a power semiconductor element, an inverter control circuit controlling the inverter, and a booster transformer boosting the output voltage of the inverter on a board, wherein the choke coil has an air gap at the core portion, and a Hall element is arranged at the air gap. The power semiconductor element is attached at the heat radiation fin directly by soldering, and further the booster transformer is a magnetron drive booster transformer in which the primary winding and the secondary winding surround the bar shape core respectively. By arranging the rectangular-hollow-shaped core having an air gap facing to the bar shaped ferrite core at the state fitting to the bar shaped ferrite core from outside of the primary winding and the secondary winding, detecting current is possible without using the CT. By making the booster transformer small and by the small sized heat radiation fin increasing cooling efficiency of the power semiconductor element, a power-supply unit for electronic oven being miniaturization, lightweight, and low cost.

What is claimed is:

1. A power-supply unit for an electronic oven comprising:
   a rectifying circuit;
   a choke coil provided at an output side of the rectifying circuit and having an air gap at a core portion;
   an inverter for converting direct current to high frequency electric power by switching a power semiconductor element;
   an inverter control circuit for controlling the inverter;
   a booster transformer boosting an output voltage of the inverter on a board; and
   a Hall element arranged at the air gap of the choke coil;
   wherein the output signal of the Hall element is transmitted to said inverter control circuit.

2. The power-supply unit for an electronic oven according to claim 1, further comprising a heat radiation fin for radiating heat of said power semiconductor element provided on the board,
   wherein said power semiconductor element is attached at said heat radiation fin directly by soldering.

3. The power-supply unit for an electronic oven according to claim 1, further comprising a heat radiation fin for radiating heat of said power semiconductor element provided on the board,
   wherein said power semiconductor element is attached at said heat radiation fin directly through a punching copper plate by soldering.

4. The power-supply unit for an electronic oven according to claim 1, wherein said booster transformer is a magnetron drive booster transformer further comprising:
   a bar shaped ferrite core;
   a primary winding and a secondary winding which are provided to surround said bar shaped ferrite core;
   a rectangular-hollow-shaped core provided to face to said bar shaped ferrite core from outside of said primary winding and said secondary winding provides an air gap between said bar shaped ferrite core and surrounding edge of said rectangular-hollow-shaped core.

5. The power-supply unit for an electronic oven according to claim 1, wherein said booster transformer is a magnetron drive booster transformer further comprising:
   a bar shaped ferrite core;
   a primary winding and a secondary winding provided to surround said bar shaped ferrite core;
   a rectangular-hollow-shaped core provided to face to said bar shaped ferrite core from outside of said primary winding and said secondary winding provides an air gap between said bar shaped ferrite core and inside of said rectangular-hollow-shaped core.

* * * * *

UNITED STATES PATENT AND TRADEMARK OFFICE
CERTIFICATE OF CORRECTION

PATENT NO. : 6,891,738 B2
DATED : May 10, 2005
INVENTOR(S) : Mihara et al.

It is certified that error appears in the above-identified patent and that said Letters Patent is hereby corrected as shown below:

Column 9,
Line 38, please delete "3" and insert therefor -- is --.
Line 51, please delete "t" and insert therefor -- at --.

Signed and Sealed this

Ninth Day of August, 2005

JON W. DUDAS
*Director of the United States Patent and Trademark Office*